(12) United States Patent
Want et al.

(10) Patent No.: US 9,666,013 B2
(45) Date of Patent: May 30, 2017

(54) CLOUD-BASED VENDING

(71) Applicant: GOOGLE INC., Mountain View, CA (US)

(72) Inventors: Roy Want, Los Altos, CA (US); Scott Arthur Jenson, Palo Alto, CA (US); William Noah Schilit, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/869,131

(22) Filed: Sep. 29, 2015

(65) Prior Publication Data

US 2017/0092034 A1   Mar. 30, 2017

(51) Int. Cl.
 *G07F 11/00* (2006.01)
 *G05B 15/02* (2006.01)
 *H04W 4/00* (2009.01)

(52) U.S. Cl.
 CPC ............ *G07F 11/002* (2013.01); *G05B 15/02* (2013.01); *H04W 4/008* (2013.01)

(58) Field of Classification Search
 CPC ..... G07F 11/002; G06Q 20/18; G06Q 20/322
 USPC .................................................. 700/230–244
 See application file for complete search history.

(56) References Cited

U.S. PATENT DOCUMENTS

| | | | | |
|---|---|---|---|---|
| 7,024,552 B1 * | 4/2006 | Caswell | ............... | G06Q 20/367 380/258 |
| 7,574,377 B2 * | 8/2009 | Carapelli | ............... | G06Q 20/32 705/26.43 |
| 7,627,496 B2 * | 12/2009 | Walker | .................. | G06Q 20/02 705/16 |
| 7,877,289 B1 * | 1/2011 | Cunningham | ......... | G06Q 30/02 705/14.26 |
| 8,666,905 B2 * | 3/2014 | Wiechers | ............. | G06Q 20/367 705/64 |
| 8,781,622 B2 * | 7/2014 | Mockus | ................ | G06Q 20/18 700/232 |

(Continued)

OTHER PUBLICATIONS

Jenson, et al. "Building an On-ramp for the Internet of Things", Proceedings of the 2015 Workshop on IoT challenges in Mobile and Industrial Systems, May 18, 2015, 4 pages.

*Primary Examiner* — Timothy Waggoner
(74) *Attorney, Agent, or Firm* — Brake Hughes Bellermann LLP

(57) ABSTRACT

In a general aspect, a computer-implemented method can include receiving, at a computing device, a beacon signal including a vending device identifier and sending, to a cloud-based vending service, the vending device identifier. The method can further include receiving, from the cloud-based vending service, an indication of at least one product available for purchase from the vending device and receiving, at the computing device, an indication of a selected product of the at least one product available for purchase. The method can also include sending, to the cloud based service, a request to purchase the selected product and receiving, from the cloud-based vending service, a purchase token for the selected product. The method can still further include sending, to the vending device, the purchase token and receiving, from the vending device, an acknowledgment that the purchase token has been used to purchase the selected product.

20 Claims, 3 Drawing Sheets

(56) References Cited

U.S. PATENT DOCUMENTS

| | | | | |
|---|---|---|---|---|
| 2003/0014315 | A1* | 1/2003 | Jaalinoja | G06Q 20/045 705/18 |
| 2015/0100152 | A1* | 4/2015 | Barragan Trevino | G06Q 20/322 700/232 |
| 2015/0106196 | A1* | 4/2015 | Williams | G06Q 20/227 705/14.51 |
| 2015/0170132 | A1* | 6/2015 | Patel | G06Q 20/40 705/44 |
| 2016/0019540 | A1* | 1/2016 | Tsutsui | G06Q 20/327 705/71 |
| 2016/0188840 | A1* | 6/2016 | Eramian | G07F 11/002 700/237 |

* cited by examiner

CLOUD-BASED VENDING

TECHNICAL FIELD

This disclosure relates to devices, systems and approaches for facilitating cloud-based vending purchases. More specifically, this disclosure relates to approaches for facilitating purchases from vending devices without a data network connection (e.g., an Internet connection, a World Wide Web connection, or the like).

SUMMARY

According to one general aspect, a computer-implemented method can include receiving, at a computing device, a beacon signal including a vending device identifier and sending, to a cloud-based vending service, the vending device identifier. The method can also include receiving, from the cloud-based vending service, an indication of at least one product available for purchase from the vending device and receiving, at the computing device, an indication of a selected product of the at least one product available for purchase. The method can further include sending, to the cloud based service, a request to purchase the selected product and receiving, from the cloud-based vending service, a purchase token for the selected product. The method can still further include sending, to the vending device, the purchase token and receiving, from the vending device, an acknowledgment that the purchase token has been used to purchase the selected product.

Implementations can include one or more of the following features. For example, the method can include, after receiving the acknowledgment, sending a message to the cloud-based vending service indicating that the purchase token has been used to purchase the selected product. The beacon signal can be a BLUETOOTH LOW ENERGY (BLE) beacon signal. The vending device identifier can include a uniform resource locator (URL). The vending device identifier can include a text label identifying the vending device.

Receiving the indication of the at least one product available for purchase can include receiving a web page. The purchase token can include a hash value. The hash value can be based on at least one of the vending device identifier; a random number generated by the vending device, the random number being included in the beacon signal; a secret, the secret being known by the vending device and the cloud-based vending service; a current date; a current time; and an identifier of the selected product.

The method can include, prior to receiving the purchase token for the selected product, receiving, from the cloud based vending service, a request to set up an account with the cloud-based vending service and sending, to the cloud-based vending service, account information in response to the request to set up the account. The request to purchase the product can include an indication of an account to be charged for the purchase. The indication of the account to be charged for the purchase can include a session cookie.

The method can include, prior to sending the vending device identifier, receiving, at the computing device, a selection of the vending device from a list of vending devices. The list of vending devices can be ranked based on physical proximity to the computing device.

In another general aspect, a system can include a vending device including a radio transceiver configured to transmit a beacon signal including an identifier of the vending device, a cloud-based vending service associated with the vending device and a mobile computing device. The mobile computing device can be configured to receive the beacon signal and to communicate with the cloud-based vending service and the vending device to purchase a product from the vending device and send, to the cloud-based vending service, the identifier of the vending device. The mobile computing device can also be configured to receive, from the cloud-based vending service, an indication of at least one product available for purchase from the vending device; receive an indication of a product selection; and send, to the cloud-based vending service, a request to purchase the selected product. The mobile computing device can also be configured to receive, from the cloud-based vending service, a purchase token for the selected product; send, to the vending device, the purchase token; and receive, from the vending device, an acknowledgment that the purchase token has been used to purchase the selected product. The vending device can be configured to validate the purchase token and dispense the selected product.

Implementations can include one or more of the following features. For example, the radio transceiver can include a BLUETOOTH LOW ENERGY (BLE) radio transceiver. The purchase token can include a first hash value. Validating the purchase token can include computing a second hash value and comparing the second hash value to the first hash value. The first hash value and the second hash value can both be based on at least one of the identifier of the vending device; a random number generated by the vending device, the random number being included in the beacon signal; a secret, the secret being known by the vending device and the cloud-based vending service; a current time; a current date; and an identifier of the product requested for purchase. Sending the request to purchase the selected product can include sending a session cookie indicating an account to charge for the selected product.

In another general aspect, a computer-implemented method can include receiving, at a computing device, a beacon signal including a vending device identifier and sending, to a cloud-based vending service, the vending device identifier. The method can also include receiving, from the cloud-based vending service, an indication of at least one product available for purchase from the vending device and receiving, at the computing device, an indication of a selected product of the at least one product available for purchase. The method can further include sending, to the cloud based service, a request to purchase the selected product and receiving, from the cloud-based vending service, a purchase token for the selected product. The method can still further include sending, to the vending device, the purchase token; processing, by the vending device, the purchase token, the processing including dispensing the selected product; and retaining, at the vending device, a record that the purchase token has been used to purchase the selected product.

Implementations can include one or more of the following features. For example, the computing device can be a first computing device, and the method can further include retrieving, from the vending device by a second computing device, the record that the purchase token has been used to purchase the selected product and providing, to the cloud-based vending service by the second computing device, the record that the purchase token has been used to purchase the selected product. The purchase token can include a hash value. The hash value can be based on at least one of the vending device identifier; a random number generated by the vending device, the random number being included in the beacon signal; a secret, the secret being known by the vending device and the cloud-based vending service; a current date; a current time; and an identifier of the selected product.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

This disclosure is directed to approaches (systems and methods) for vending of products and services (e.g., any number of consumer products or services including drinks, food, electronics, movie rentals, video game rentals, personal care products, entry into a venue, etc.) from vending machines or vending devices using a cloud-based vending service (e.g., Internet-based vending service). In the approaches described herein, the cloud-based vending service can, among other operations, process financial transactions (e.g., in cooperation with a computing device) to facilitate purchase of products and/or services from an associated vending machine (or vending device). The computing device can be a mobile computing device, such as a smartphone or a tablet computer, with access to the cloud-based vending service (e.g., via the Internet and/or a cellular, or other data network). In other implementations, the computing device can take other forms, such as netbook, laptop computer, etc. In this disclosure, the terms vending machine and vending device are used interchangeably and the configuration of a particular vending machine or vending device will depend on the particular implementation. Further in this disclosure, the terms product(s) and service(s) are also used interchangeably and a particular item being purchased using the approaches described herein will depend on the specific implementation.

In the described implementations, the computing device (mobile computing device) can be used to provide a "proxy" data network (e.g., Internet connection) for the vending machine, where the vending machine communicates with the mobile computing device using a low power radio transceiver, such as a BLUETOOTH LOW ENERGY (BLE) radio transceiver. In other implementations, other radio transceivers can be used for communication between a vending device and a mobile computing device (or other computing device). Such approaches allow a consumer to make a cloud-based vending purchase from such a vending machine without the vending machine having a dedicated Internet or data network connection. Such approaches can be financially advantageous for an operator (owner) of the vending machine, as providing a dedicated Internet (or data network) connection in the vending machine can be cost prohibitive (e.g., due to profit margins of vending machine sales).

Figure 1:
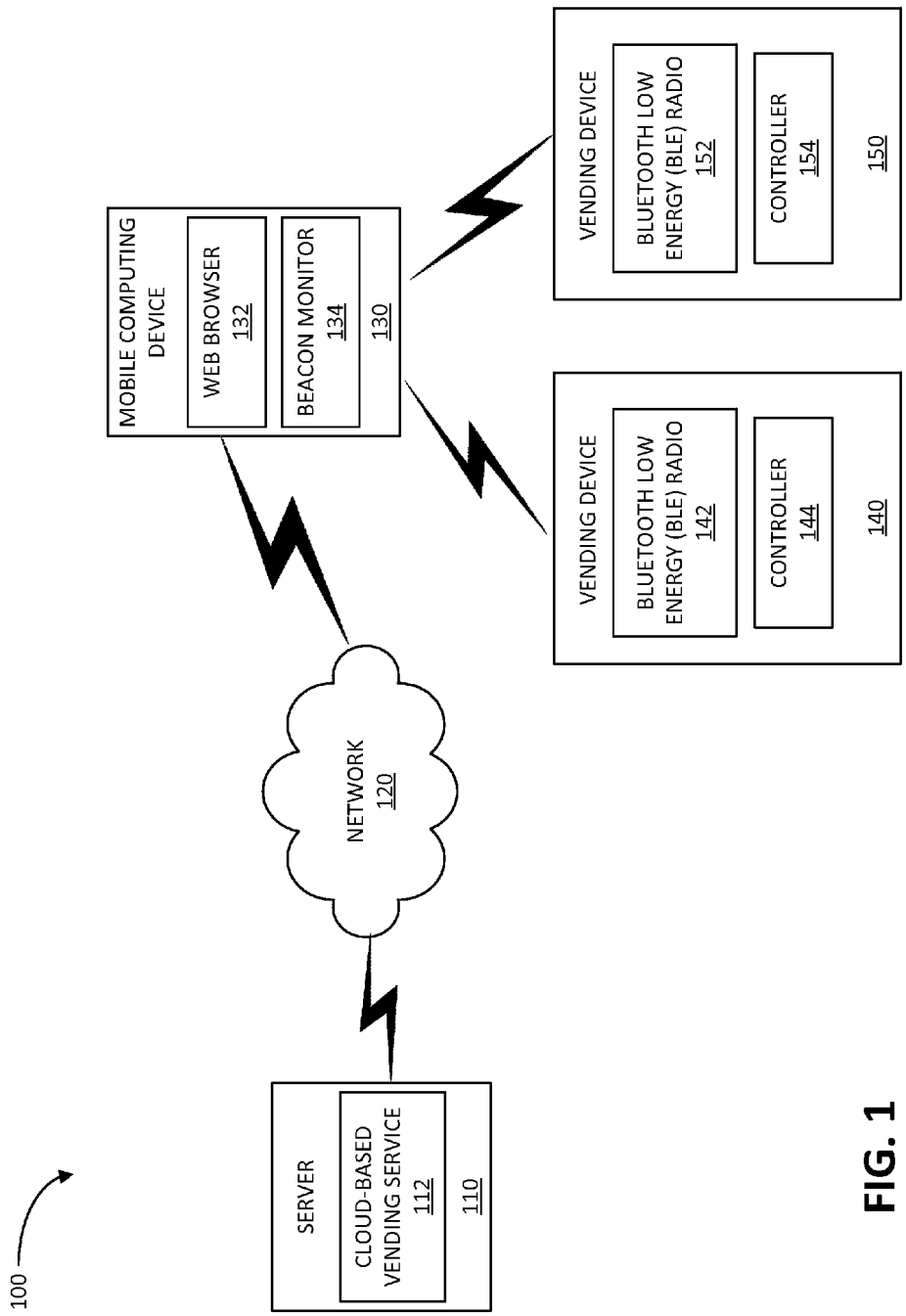
FIG. 1 is a block diagram illustrating a system for cloud-based vending, according to an implementation.

FIG. 1 is a block diagram illustrating a system 100 for cloud-based vending, according to an implementation. As shown in FIG. 1, the system 100 includes a server 110, a data network (network) 120 (such as the Internet or other data network), a mobile computing device 130, a first vending device (vending machine) 140 and a second vending device 150. The elements of the system 100 are shown by way of example and for purposes of illustration. In other implementations, the system 100 can include additional servers, additional data networks, additional mobile computing devices (or other computing devices), and/or additional vending devices (or a single vending device).

As shown in FIG. 1, the server 110 can include (e.g., implement, host, etc.) a cloud-based vending service 112. The server 110 can be configured to communicate with the network 120 via a data connection that can include a wireless data connection and/or a wired data connection. In the system 100, the mobile computing device 130 can include a web browser 132 and a beacon monitor 134. The web browser 132 can be used to display information (on a display of the mobile computing device 130) related to making a cloud-based vending purchase from the vending device 134. The mobile computing device 120 can be configured to communicate with the network 120 (and the cloud-based vending service through the network 120) via a data connection that can include a wireless data connection and/or a wired data connection.

The vending devices 140 and 150 of the system 110 can include, respectively, BLE radios 142 and 152, and controllers 144 and 154. The BLE radios 142 and 152 (or other radio transceivers) can be configured to communicate via a wireless data connection (e.g., a local connection) with the mobile computing device 130 to facilitate cloud-based vending product purchases from the vending devices 140 and 150. For purposes of illustration and clarity, approaches for making cloud-based vending purchases are generally described herein with reference to the vending device 140. In other implementations, cloud-based vending purchases can be similarly conducted with the vending device 150 (or other vending devices).

In the system 100, the BLE radio 142 (and the BLE radio 152) can transmit (periodically transmit) a beacon signal that includes a URL corresponding with the vending device 140 (or the vending device 150). In an implementation, such a beacon signal can be transmitted approximately every 700 milliseconds. In other implementations a beacon signal can be transmitted more frequently or less frequently. The URL can also indicate (e.g., include a designation of) the cloud-based vending service 112 with which the vending device is associated. For example, with reference to the vending device 140, the URL included in its beacon signal can include an identifier (e.g., a unique identifier) of the vending device 140 and a web address for the cloud-based vending service 112. The unique identifier of the vending device (vending device ID) can indicate to the cloud-based vending service, the exact vending device (e.g., the vending device 140) from which a consumer wishes to make a purchase. For instance, the vending device ID can be a text label that is unique with respect to other vending devices that are associated with the cloud-based vending service 142).

The beacon signal can also include a random number (RN) that is generated by the vending device 140 (e.g., by the controller 144), where a given RN is used for a single cloud-based vending transaction. The use of such a per-transaction RN prevents reuse of purchase tokens (as described herein) for purchase of products from the vending device 140. Said another way, in the described approaches, the vending device 140 can be configured to dispense a single product (or multiple products purchased together) for each per-transaction RN generated by the vending device 140 (and an associated purchase token).

The beacon monitor 134 of the mobile computing device 130, when in transmission range of the BLE radio 142 (and/or the BLE radio 152), can detect a corresponding beacon signal from the vending device 140 (and/or the vending device 150). In response to detecting a beacon signal (or beacon signals), the mobile computing device 130 can provide a notification (e.g., on a display of the mobile computing device 130) that a purchase can be made from the vending device 140 and/or the vending device 150. In an implementation, the beacon monitor 134 can communicate with the web browser 132 to indicate detection of one or more beacon signals. In response to this indication from the beacon monitor 134, the web browser 132 can display a list of vending devices that are in range (BLE radio transmission range) of the mobile computing device 130 (e.g., using their unique text labels). In other implementations, the indication that the mobile computing device 130 is in range of the beacon signal of the vending device 140 and/or the beacon signal of the vending device 150 can be provided in other ways, such as with a user interface of an application corresponding with the cloud-based vending service 112. Such a cloud-based vending service application can be installed and executed (e.g., in response to receiving a beacon signal) on the mobile computing device 130. In still other implementations, the beacon monitor 132 can be integrated with the web browser 134 on the mobile computing device 130.

In the system 100, in the event the beacon monitor 134 detects that the mobile computing device 130 is within range of multiple beacon signals (e.g., the beacon signal from the vending device 140 and the beacon signal from the vending device 150), the beacon monitor 134 (or other component of the mobile computing device 130) can be configured to rank the vending devices 140 and 150, such as in a displayed list as discussed above, in order of their physical proximity to the mobile computing device. For instance, vending devices that are closer to the mobile computing device can be ranked higher than vending devices that are further away from (but still in transceiver range of) the mobile computing device 130. In an implementation, such ranking can be determined, by the mobile computing device 130, based on the received signal strengths of the respective beacon signal (e.g., as compared to their transmission signal strengths, which can be indicated in the respective beacon signals). Such a list of vending machines can include their unique text labels (or other vending device IDs), so that a consumer can verify the vending device from which they wish to make a purchase matches a device selected from the list of vending devices on the mobile computing device 130 (or other computing device). This approach can assist a consumer in selecting the correct vending device in circumstances where radio signal interference may result in a vending device closest to the mobile computing device 130 not being listed first in a list of vending devices that is ranked by received beacon signal strength.

Figure 2:
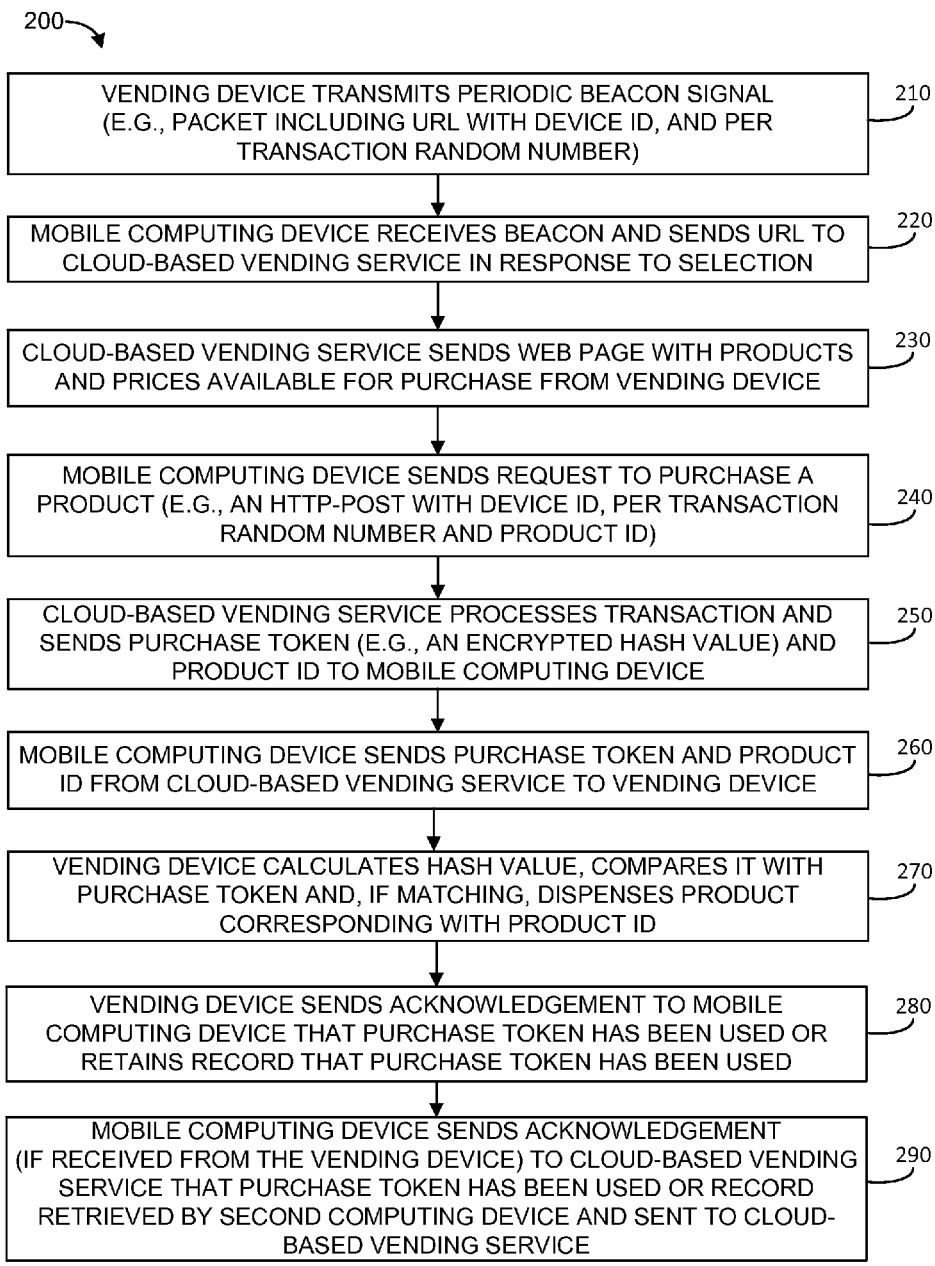
FIG. 2 is a flowchart illustrating a method for cloud-based vending, according to an implementation.

FIG. 2 is a flowchart illustrating a method 200 for cloud-based vending, according to an implementation. For purposes of illustration, the method 200 will be described with further reference to the system 100 shown in FIG. 1. It will be appreciated, however, that the method 200 can be implemented in systems having other arrangements. It will also be appreciated that, in some implementations, certain operations of the method 200 can be eliminated or modified. Furthermore, the method 200 could include operations other than those shown in FIG. 2.

At block 210, the method 200 includes a vending device, such as the vending device 140, transmitting a beacon signal, such as the beacon signals described herein. For instance, the beacon signal of block 210 can include a packet that, in turn, includes a URL for an associated cloud-based vending service, a vending device ID (e.g., a unique text label) and a per transaction RN. As described herein, the beacon signal can be a signal transmitted by a BLE radio transceiver or other appropriate radio transceiver.

At block 220, the method 200 can include a computing device, such as the mobile computing device 130, receiving the beacon signal (e.g., at beacon monitor 134) and sending the vending device ID to the URL of the beacon signal (e.g., to the cloud-based vending service 112), such as in response to a user indicating they wish to make a vending purchase. In instances where the mobile computing device 130 is within range of multiple vending device beacon signals, a user of the mobile computing device 130 can select the particular vending device from which they wish to make a purchase from a list of the multiple vending devices. As described herein, such a list may include unique text labels associated with each vending device that is within radio signal range of the mobile computing device 130. Such a list may be a ranked list of vending devices that are in range, such as a list that is ranked based on received beacon signal strength (e.g., by physical proximity, nearest to farthest, to the mobile computing device 130).

At block 230, the method 200 can include the mobile computing device 130 receiving an indication of at least one product that is available for purchase from the vending device 140. In one implementation, this indication can be a web page that displays products available for purchase. In other implementations, products available for purchase could be displayed by an application that is associated with the cloud-based vending service 112, where the application is installed and executed on the mobile computing device 130. In still other implementations, other approaches for displaying products that are available for purchase can be used.

At block 240, the method 200 can include receiving, at the mobile computing device 130, a selection of a product for purchase from the at least one product of block 230 as part of sending a request to purchase the selected product (e.g., in response to receiving the selection) to the cloud-based vending service 112. In other instances, a consumer may select more than one product for purchase and the mobile computing device 130 may provide an indication, after the consumer makes the multiple selections, to purchase the multiple products in a single transaction. In an implementation, sending the request to purchase the selected product (or products) may include sending an indication of an account (e.g., a credit card account, bank account, etc.) that is to be charged for the purchase. For instance, a session (browser) cookie that contains such account information can be included as part of the request to purchase.

At block 250, the method 200 can include the cloud-based vending service processing the transaction for the selected products or products. For example, the cloud-based vending service 112 can charge an account that was indicated in the request to purchase, such as included in a cookie, as discussed above. In other instances, the cloud-based vending service 112 may send a request to the mobile computing device 130 for payment information (e.g., to be entered by the consumer), such as a credit card number and/or information to establish an account with the cloud-based vending service 112.

Also at block 250, after processing the transaction for the requested purchase, the cloud-based vending service 112 can produce and sends a purchase token (e.g., indicating the selected product or products have been paid for) to the mobile computing device 130 (e.g., via the network 120). The purchase token may be an encrypted hash value (e.g., a one-way hash value) that is based one or more values related to the request purchase. For instance, the purchase token can be an encrypted hash value (e.g., generated using an SHA-1 algorithm, an MD5 algorithm, and so forth) that is based on at least one of the vending device ID; the per transaction RN associated with the purchase; a secret value that is known only by the vending device and the cloud-based vending service; a current date, a current time; and an identifier of the selected product or products.

After receiving the purchase token at block 250, the mobile computing device 130 can, at block 260, send the purchase token to the vending device 140. At block 270 the vending device 140 can, in response to receiving the purchase, generate a second hash value based on the same set of values and same hashing algorithm as used by the cloud-based vending service 112 to generate the purchase token. The vending device 140 can then compare the purchase token with the second hash value and, if they match, dispense the product or products (e.g., a physical product or access to a service or venue) associated with the purchase token. In such an approach, the use of an encrypted (one-way) hash prevents the use of fraudulent tokens to obtain products from a vending device, such as the vending device 140. Further, use of a secret value that is known only to the cloud-based vending service 112 and the vending device 140 can also prevent the use of fraudulent tokens.

The method 200, at block 280, further includes the vending device 140 sending an acknowledgement to the mobile computing device 130 that the purchase token has been used or, alternatively, the vending device 140 retaining a record that the purchase token has been used. If the vending device 140 retains a record that the purchase token has been used, that record can be retrieved later, such as by a second computing device (not shown). For instance, when the vending device 140 is being serviced (e.g., filled with products) a service person can retrieve records of used purchase tokens. Alternatively, the second computing device can be, for example, a computing device of a second consumer that makes a purchase from the vending device 140. At block 290, the method 200 includes either the mobile computing device 130 or the second computing device sending the acknowledgment, or retrieved record that the purchase token has been used to the cloud-based vending service 112, which can indicate to the cloud-based vending service 112 that the purchase associated with the purchase token has been successfully completed.

According to one general aspect, a computer-implemented method can include receiving, at a computing device, a beacon signal including a vending device identifier and sending, to a cloud-based vending service, the vending device identifier. The method can also include receiving, from the cloud-based vending service, an indication of at least one product available for purchase from the vending device and receiving, at the computing device, an indication of a selected product of the at least one product available for purchase. The method can further include sending, to the cloud based service, a request to purchase the selected product and receiving, from the cloud-based vending service, a purchase token for the selected product. The method can still further include sending, to the vending device, the purchase token and receiving, from the vending device, an acknowledgment that the purchase token has been used to purchase the selected product.

Implementations can include one or more of the following features. For example, the method can include, after receiving the acknowledgment, sending a message to the cloud-based vending service indicating that the purchase token has been used to purchase the selected product. The beacon signal can be a BLUETOOTH LOW ENERGY (BLE) beacon signal. The vending device identifier can include a uniform resource locator (URL). The vending device identifier can include a text label identifying the vending device.

Receiving the indication of the at least one product available for purchase can include receiving a web page. The purchase token can include a hash value. The hash value can be based on at least one of the vending device identifier; a random number generated by the vending device, the random number being included in the beacon signal; a secret, the secret being known by the vending device and the cloud-based vending service; a current date; a current time; and an identifier of the selected product.

The method can include, prior to receiving the purchase token for the selected product, receiving, from the cloud based vending service, a request to set up an account with the cloud-based vending service and sending, to the cloud-based vending service, account information in response to the request to set up the account. The request to purchase the product can include an indication of an account to be charged for the purchase. The indication of the account to be charged for the purchase can include a session cookie.

The method can include, prior to sending the vending device identifier, receiving, at the computing device, a selection of the vending device from a list of vending devices. The list of vending devices can be ranked based on physical proximity to the computing device.

In another general aspect, a system can include a vending device including a radio transceiver configured to transmit a beacon signal including an identifier of the vending device, a cloud-based vending service associated with the vending device and a mobile computing device. The mobile computing device can be configured to receive the beacon signal and to communicate with the cloud-based vending service and the vending device to purchase a product from the vending device and send, to the cloud-based vending service, the identifier of the vending device. The mobile computing device can also be configured to receive, from the cloud-based vending service, an indication of at least one product available for purchase from the vending device; receive an indication of a product selection; and send, to the cloud-based vending service, a request to purchase the selected product. The mobile computing device can also be configured to receive, from the cloud-based vending service, a purchase token for the selected product; send, to the vending device, the purchase token; and receive, from the vending device, an acknowledgment that the purchase token has been used to purchase the selected product. The vending device can be configured to validate the purchase token and dispense the selected product.

Implementations can include one or more of the following features. For example, the radio transceiver can include a BLUETOOTH LOW ENERGY (BLE) radio transceiver. The purchase token can include a first hash value. Validating the purchase token can include computing a second hash value and comparing the second hash value to the first hash value. The first hash value and the second hash value can both be based on at least one of the identifier of the vending device; a random number generated by the vending device, the random number being included in the beacon signal; a secret, the secret being known by the vending device and the cloud-based vending service; a current time; a current date; and an identifier of the product requested for purchase. Sending the request to purchase the selected product can include sending a session cookie indicating an account to charge for the selected product.

In another general aspect, a computer-implemented method can include receiving, at a computing device, a beacon signal including a vending device identifier and sending, to a cloud-based vending service, the vending device identifier. The method can also include receiving, from the cloud-based vending service, an indication of at least one product available for purchase from the vending device and receiving, at the computing device, an indication of a selected product of the at least one product available for purchase. The method can further include sending, to the cloud based service, a request to purchase the selected product and receiving, from the cloud-based vending service, a purchase token for the selected product. The method can still further include sending, to the vending device, the purchase token; processing, by the vending device, the purchase token, the processing including dispensing the selected product; and retaining, at the vending device, a record that the purchase token has been used to purchase the selected product.

Implementations can include one or more of the following features. For example, the computing device can be a first computing device, and the method can further include retrieving, from the vending device by a second computing device, the record that the purchase token has been used to purchase the selected product and providing, to the cloud-based vending service by the second computing device, the record that the purchase token has been used to purchase the selected product. The purchase token can include a hash value. The hash value can be based on at least one of the vending device identifier; a random number generated by the vending device, the random number being included in the beacon signal; a secret, the secret being known by the vending device and the cloud-based vending service; a current date; a current time; and an identifier of the selected product.

Figure 3:
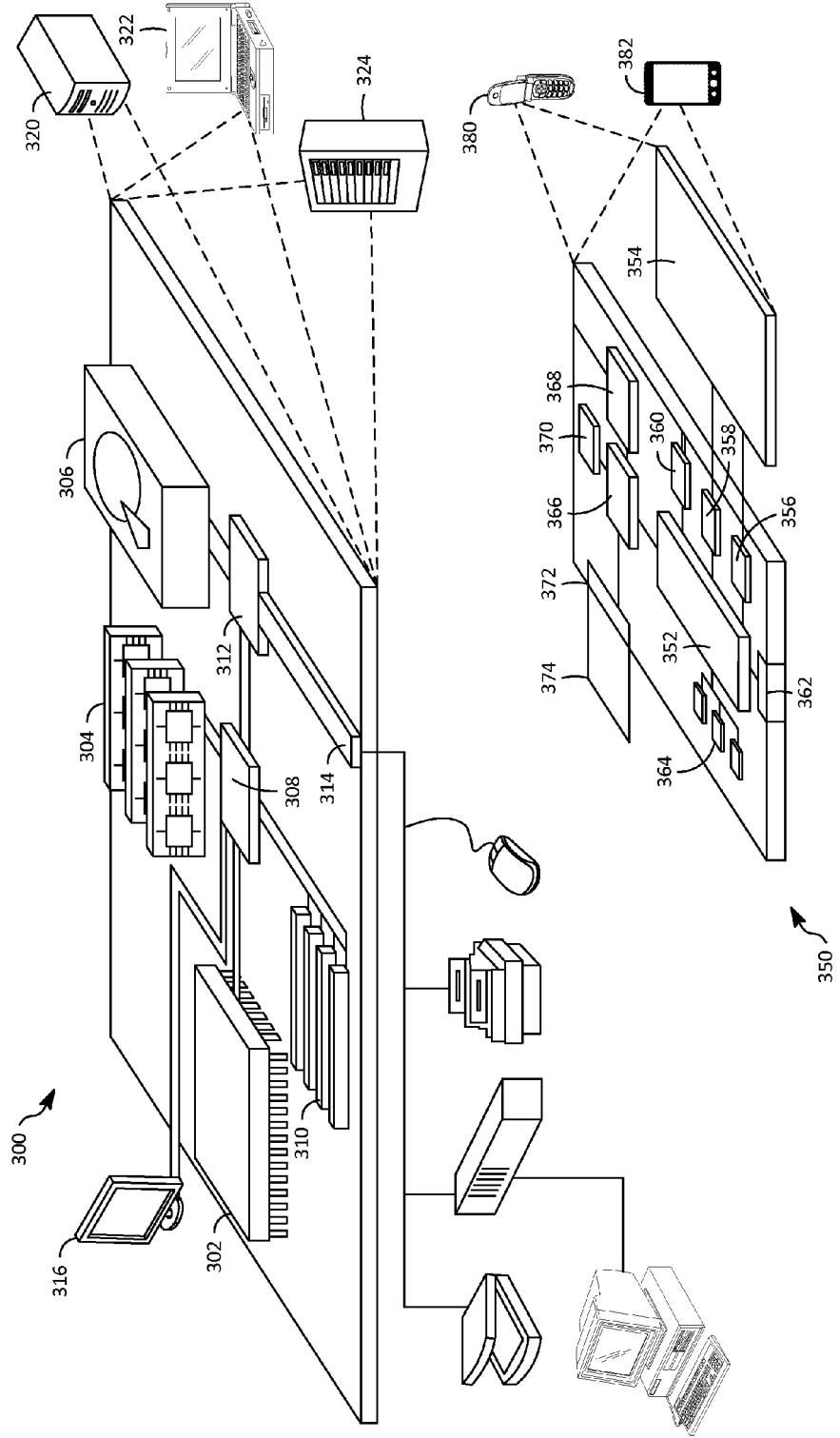
FIG. 3 is a diagram illustrating an example of a computer device and a mobile computer device that can be used to implement the techniques described here.

FIG. 3 shows an example of a generic computer device 300 and a generic mobile computer device 350, which may be used with the techniques described here. Computing device 300 is intended to represent various forms of digital computers, such as laptops, desktops, workstations, personal digital assistants, servers, blade servers, mainframes, and other appropriate computers. Computing device 350 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 300 includes a processor 302, memory 304, a storage device 306, a high-speed interface 308 connecting to memory 304 and high-speed expansion ports 310, and a low speed interface 312 connecting to low speed bus 314 and storage device 306. Each of the components 302, 304, 306, 308, 310, and 312, are interconnected using various busses, and may be mounted on a common motherboard or in other manners as appropriate. The processor 302 can process instructions for execution within the computing device 300, including instructions stored in the memory 304 or on the storage device 306 to display graphical information for a GUI on an external input/output device, such as display 316 coupled to high speed interface 308. In other implementations, multiple processors and/or multiple buses may be used, as appropriate, along with multiple memories and types of memory. Also, multiple computing devices 300 may be connected, with each device providing portions of the necessary operations (e.g., as a server bank, a group of blade servers, or a multi-processor system).

The memory 304 stores information within the computing device 300. In one implementation, the memory 304 is a volatile memory unit or units. In another implementation, the memory 304 is a non-volatile memory unit or units. The memory 304 may also be another form of computer-readable medium, such as a magnetic or optical disk.

The storage device 306 is capable of providing mass storage for the computing device 300. In one implementation, the storage device 306 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 304, the storage device 306, or memory on processor 302.

The high speed controller 308 manages bandwidth-intensive operations for the computing device 300, while the low speed controller 312 manages lower bandwidth-intensive operations. Such allocation of functions is exemplary only. In one implementation, the high-speed controller 308 is coupled to memory 304, display 316 (e.g., through a graphics processor or accelerator), and to high-speed expansion ports 310, which may accept various expansion cards (not shown). In the implementation, low-speed controller 312 is coupled to storage device 306 and low-speed expansion port 314. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 300 may be implemented in a number of different forms, as shown in the figure. For example, it may be implemented as a standard server 320, or multiple times in a group of such servers. It may also be implemented as part of a rack server system 324. In addition, it may be implemented in a personal computer such as a laptop computer 322. Alternatively, components from computing device 300 may be combined with other components in a mobile device (not shown), such as device 350. Each of such devices may contain one or more of computing device 300, 350, and an entire system may be made up of multiple computing devices 300, 350 communicating with each other.

Computing device 350 includes a processor 352, memory 364, an input/output device such as a display 354, a communication interface 366, and a transceiver 368, among other components. The device 350 may also be provided with a storage device, such as a microdrive or other device, to provide additional storage. Each of the components 350, 352, 364, 354, 366, and 368, are interconnected using various buses, and several of the components may be mounted on a common motherboard or in other manners as appropriate.

The processor 352 can execute instructions within the computing device 350, including instructions stored in the memory 364. The processor may be implemented as a chipset of chips that include separate and multiple analog and digital processors. The processor may provide, for example, for coordination of the other components of the device 350, such as control of user interfaces, applications run by device 350, and wireless communication by device 350.

Processor 352 may communicate with a user through control interface 358 and display interface 356 coupled to a display 354. The display 354 may be, for example, a TFT LCD (Thin-Film-Transistor Liquid Crystal Display) or an OLED (Organic Light Emitting Diode) display, or other appropriate display technology. The display interface 356 may comprise appropriate circuitry for driving the display 354 to present graphical and other information to a user. The control interface 358 may receive commands from a user and convert them for submission to the processor 352. In addition, an external interface 362 may be provided in communication with processor 352, so as to enable near area communication of device 350 with other devices. External interface 362 may provide, for example, for wired communication in some implementations, or for wireless communication in other implementations, and multiple interfaces may also be used.

The memory 364 stores information within the computing device 350. The memory 364 can be implemented as one or more of a computer-readable medium or media, a volatile memory unit or units, or a non-volatile memory unit or units. Expansion memory 374 may also be provided and connected to device 350 through expansion interface 372, which may include, for example, a SIMM (Single In Line Memory Module) card interface. Such expansion memory 374 may provide extra storage space for device 350, or may also store applications or other information for device 350. Specifically, expansion memory 374 may include instructions to carry out or supplement the processes described above, and may include secure information also. Thus, for example, expansion memory 374 may be provided as a security module for device 350, and may be programmed with instructions that permit secure use of device 350. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 364, expansion memory 374, or memory on processor 352, that may be received, for example, over transceiver 368 or external interface 362.

Device 350 may communicate wirelessly through communication interface 366, which may include digital signal processing circuitry where necessary. Communication interface 366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 368. In addition, short-range communication may occur, such as using a Bluetooth, WiFi, or other such transceiver (not shown). In addition, GPS (Global Positioning System) receiver module 370 may provide additional navigation- and location-related wireless data to device 350, which may be used as appropriate by applications running on device 350.

Device 350 may also communicate audibly using audio codec 360, which may receive spoken information from a user and convert it to usable digital information. Audio codec 360 may likewise generate audible sound for a user, such as through a speaker, e.g., in a handset of device 350. Such sound may include sound from voice telephone calls, may include recorded sound (e.g., voice messages, music files, etc.) and may also include sound generated by applications operating on device 350.

The computing device 350 may be implemented in a number of different forms, as shown in the figure. For example, it may be implemented as a cellular telephone 380. It may also be implemented as part of a smart phone 382, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Therefore, other implementations are within the scope of the following claims.

What is claimed is:

1. A computer-implemented method comprising:
   receiving, at a computing device, a beacon signal including a vending device identifier and a random number generated by the vending device, the random number being for a single transaction;
   sending, to a cloud-based vending service, the vending device identifier;
   receiving, from the cloud-based vending service, an indication of at least one product available for purchase from the vending device;
   receiving, at the computing device, an indication of a selected product of the at least one product available for purchase;
   sending, to the cloud based service, a request to purchase the selected product, the request including the random number;
   receiving, from the cloud-based vending service, an encrypted purchase token for the selected product, the encrypted purchase token being based on the random number;
   sending, to the vending device, the encrypted purchase token; and
   receiving, from the vending device, an acknowledgment that the encrypted purchase token has been processed by the vending device and used to purchase the selected product.

2. The computer-implemented method of claim 1, further comprising, after receiving the acknowledgment, sending a message to the cloud-based vending service indicating that the encrypted purchase token has been used to purchase the selected product.

3. The computer-implemented method of claim 1, wherein the beacon signal is a BLUETOOTH LOW ENERGY (BLE) beacon signal.

4. The computer-implemented method of claim 1, wherein the vending device identifier is included in a uniform resource locator (URL).

5. The computer-implemented method of claim 1, wherein the vending device identifier includes a text label identifying the vending device.

6. The computer-implemented method of claim 1, wherein receiving the indication of the at least one product available for purchase includes receiving a web page.

7. The computer-implemented method of claim 1, wherein the encrypted purchase token includes a hash value.

8. The computer-implemented method of claim 1, wherein the encrypted purchase token is further based on at least one of:
   the vending device identifier;
   a secret, the secret being known by the vending device and the cloud-based vending service;
   a current date;
   a current time; and
   an identifier of the selected product.

9. The computer-implemented method of claim 1, further comprising, prior to receiving the encrypted purchase token for the selected product:
   receiving, from the cloud based vending service, a request to set up an account with the cloud-based vending service; and
   sending, to the cloud-based vending service, account information in response to the request to set up the account.

10. The computer-implemented method of claim 1, wherein the request to purchase the product includes an indication of an account to be charged for the purchase.

11. The computer-implemented method of claim 10, wherein the indication of the account to be charged for the purchase includes a session cookie.

12. The computer-implemented method of claim 1, further comprising, prior to sending the vending device identifier:
   receiving, at the computing device, a selection of the vending device from a list of vending devices, the list of vending devices being ranked based on physical proximity to the computing device.

13. A system comprising:
   a vending device including a radio transceiver configured to transmit a beacon signal including an identifier of the vending device and a random number generated by the vending device, the random number being for a single transaction;
   a cloud-based vending service associated with the vending device; and
   a mobile computing device configured to:
      receive the beacon signal and to communicate with the cloud-based vending service and the vending device to purchase a product from the vending device;
      send, to the cloud-based vending service, the identifier of the vending device;
      receive, from the cloud-based vending service, an indication of at least one product available for purchase from the vending device;
      receive an indication of a product selection;
      send, to the cloud-based vending service, a request to purchase the selected product, the request including the random number;
      receive, from the cloud-based vending service, an encrypted purchase token for the selected product, the encrypted purchase token being based on the random number;
      send, to the vending device, the encrypted purchase token; and
      receive, from the vending device, an acknowledgment that the encrypted purchase token has been processed and used to purchase the selected product,
   the vending device being configured to validate the encrypted purchase token and dispense the selected product.

14. The system of claim 13, wherein the radio transceiver includes a BLUETOOTH LOW ENERGY (BLE) radio transceiver.

15. The system of claim 13, wherein the encrypted purchase token includes a first hash value, and
   validating the purchase token includes:
      computing a second hash value; and
      comparing the second hash value to the first hash value.

16. The system of claim 15, wherein the first hash value and the second hash value are both further based on at least one of:
   the identifier of the vending device;
   a secret, the secret being known by the vending device and the cloud-based vending service;
   a current time;
   a current date; and
   an identifier of the product requested for purchase.

17. The system of claim 13, wherein sending the request to purchase the selected product includes sending a session cookie indicating an account to charge for the selected product.

18. A computer-implemented method comprising:
   receiving, at a computing device, a beacon signal including a vending device identifier and a random number generated by the vending device, the random number being for a single transaction;
   sending, to a cloud-based vending service, the vending device identifier;
   receiving, from the cloud-based vending service, an indication of at least one product available for purchase from the vending device;
   receiving, at the computing device, an indication of a selected product of the at least one product available for purchase;
   sending, to the cloud based service, a request to purchase the selected product, the request including the random number;
   receiving, from the cloud-based vending service, an encrypted purchase token for the selected product, the encrypted purchase token being based on the random number;
   sending, to the vending device, the encrypted purchase token;
   processing, by the vending device, the encrypted purchase token, the processing including validating the encrypted purchase token and dispensing the selected product; and
   retaining, at the vending device, a record that the encrypted purchase token has been used to purchase the selected product.

19. The computer-implemented method of claim 18, wherein the computing device is a first computing device, the computer-implemented method further comprising:
   retrieving, from the vending device by a second computing device, the record that the encrypted purchase token has been used to purchase the selected product; and
   providing, to the cloud-based vending service by the second computing device, the record that the encrypted purchase token has been used to purchase the selected product.

20. The computer-implemented method of claim 18, wherein the encrypted purchase token includes a hash value, the hash value being further based on at least one of:
   the vending device identifier;
   a secret, the secret being known by the vending device and the cloud-based vending service;
   a current date;
   a current time; and
   an identifier of the selected product.

* * * * *